United States Patent
Petersen, Jr.

[11] 3,862,509
[45] Jan. 28, 1975

[54] EYELESS FISHING POLE

[76] Inventor: John W. Petersen, Jr., Box 335, Frisco, Colo. 80576

[22] Filed: May 30, 1973

[21] Appl. No.: 365,146

[52] U.S. Cl.................. 43/17.5, 43/18 R, 43/24
[51] Int. Cl............................................ A01k 87/00
[58] Field of Search...................... 43/17.5, 18 R, 24

[56] References Cited
UNITED STATES PATENTS

| | | | |
|---|---|---|---|
| 2,541,609 | 2/1951 | Pullan | 43/18 R |
| 2,578,663 | 12/1951 | Beaupre | 43/18 R X |
| 2,791,676 | 5/1957 | Cote | 43/17.5 X |
| 3,017,499 | 1/1962 | Fore | 43/17.5 UX |
| 3,618,253 | 11/1971 | Edwards et al. | 43/18 R |

Primary Examiner—Louis G. Mancene
Assistant Examiner—Daniel J. Leach
Attorney, Agent, or Firm—Blair & Brown

[57] ABSTRACT

An eyeless fishing pole in which the fish line is guided down the center of a hollow telescoping fish pole with the pole being made of transparent or translucent plastic material illuminated by a flashlight mounted in the handle of the fishing pole. The telescoping pole sections are adapted to nest together and to be stored in the hollow handle of the fishing pole. The flashlight is reversible so as to be able to shine outwardly to the rear of the handle or forwardly to illuminate the plastic telescoping rod members.

In a modified form of the invention, the pole telescopes together without being disassembled.

1 Claim, 13 Drawing Figures

PATENTED JAN 28 1975
3,862,509
SHEET 1 OF 3
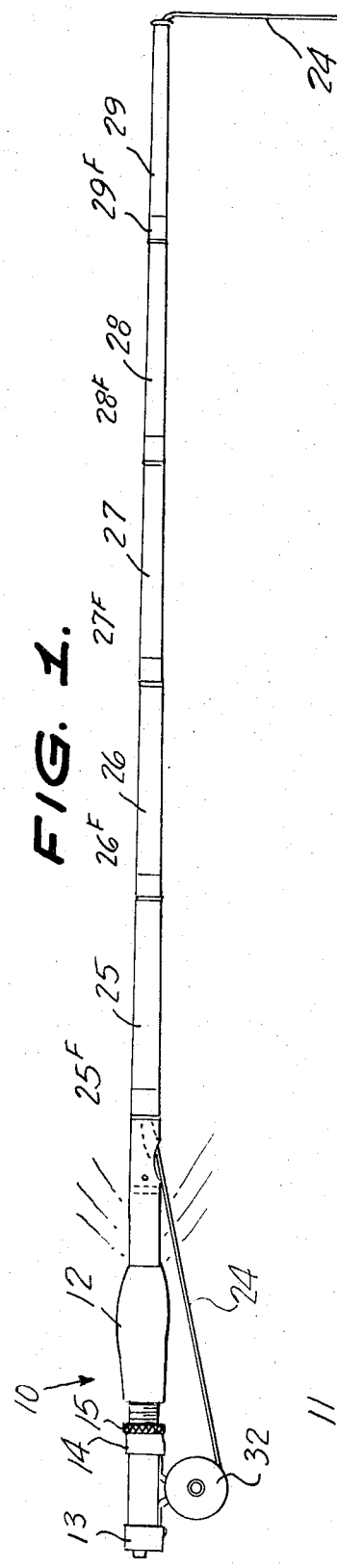
FIG. 1.
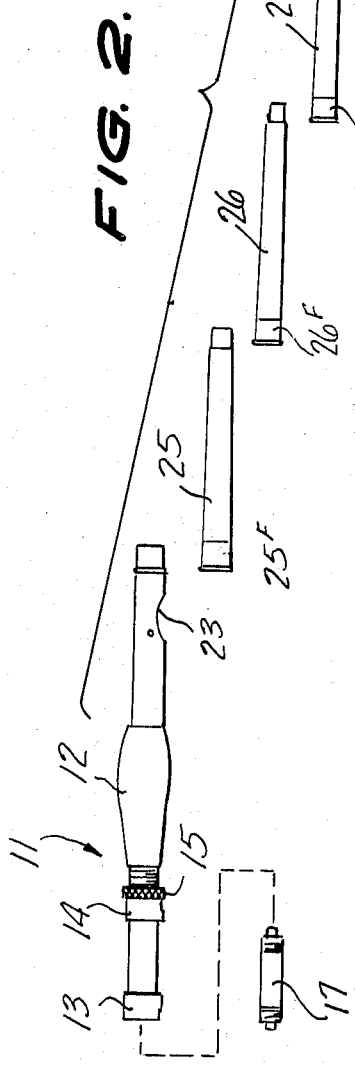
FIG. 2.
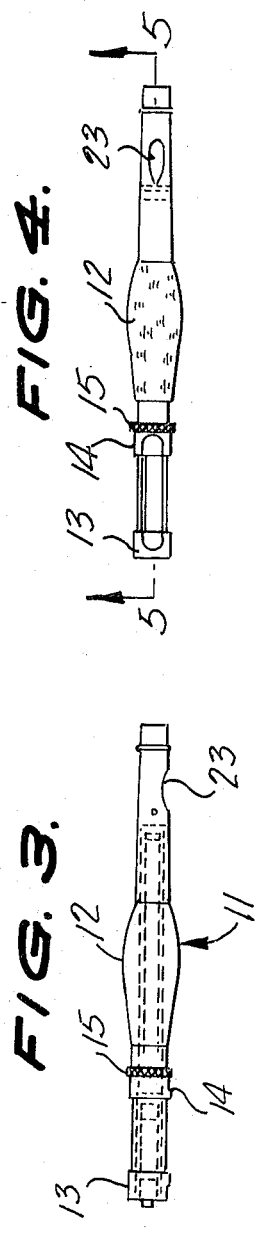
FIG. 4.
FIG. 3.

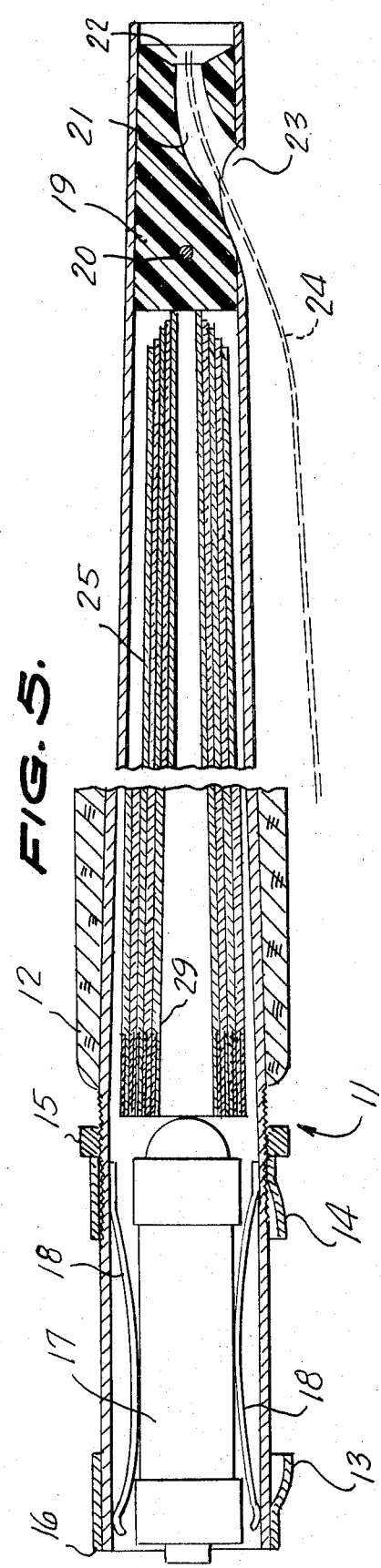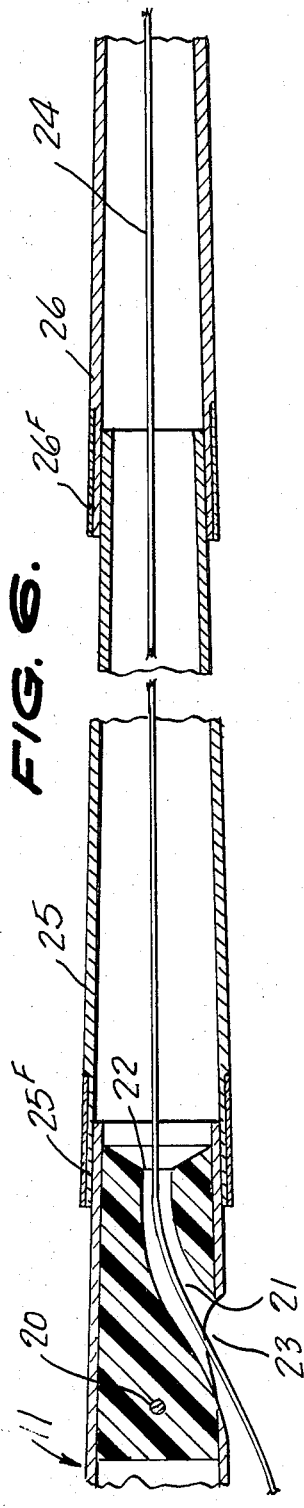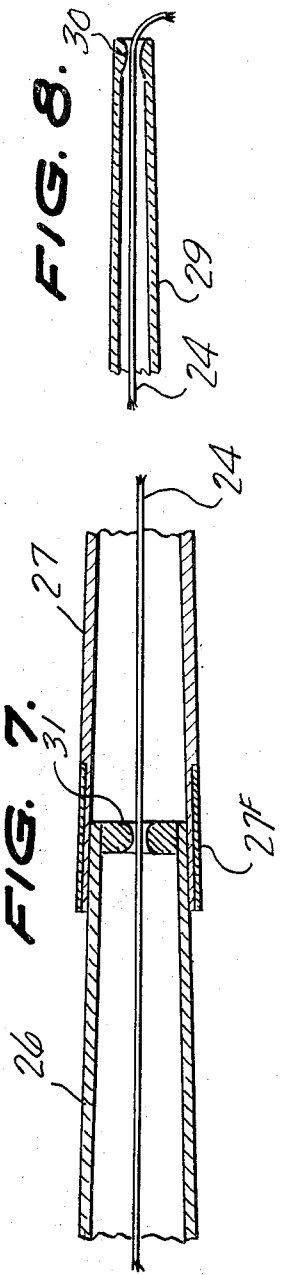

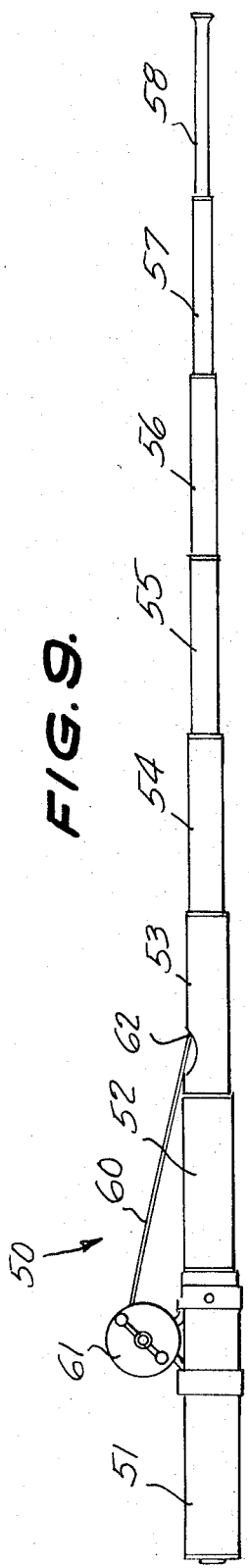
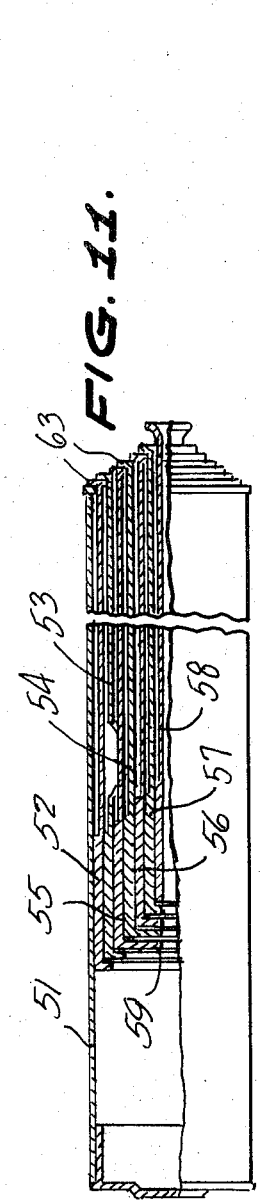
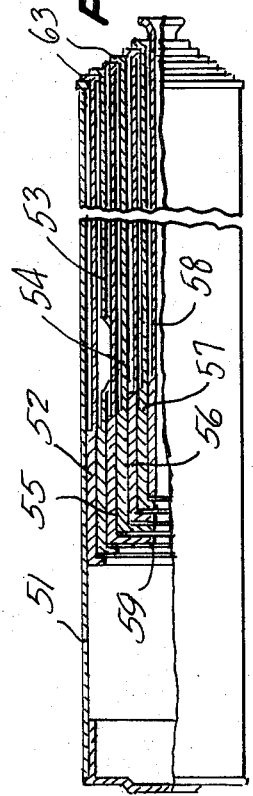
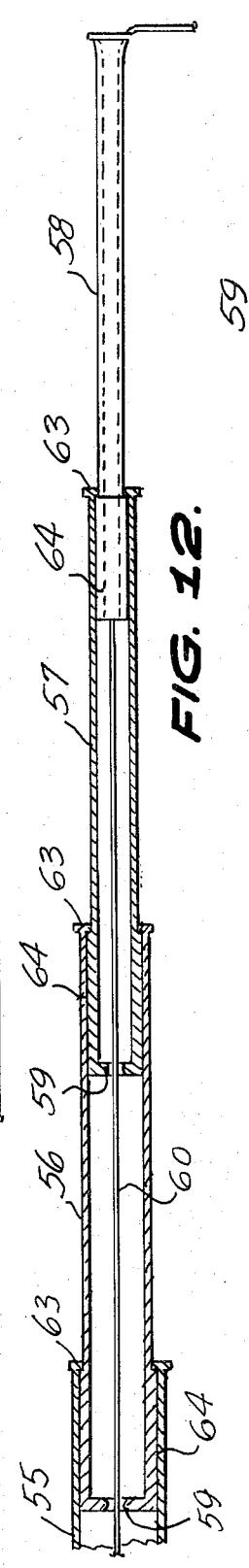
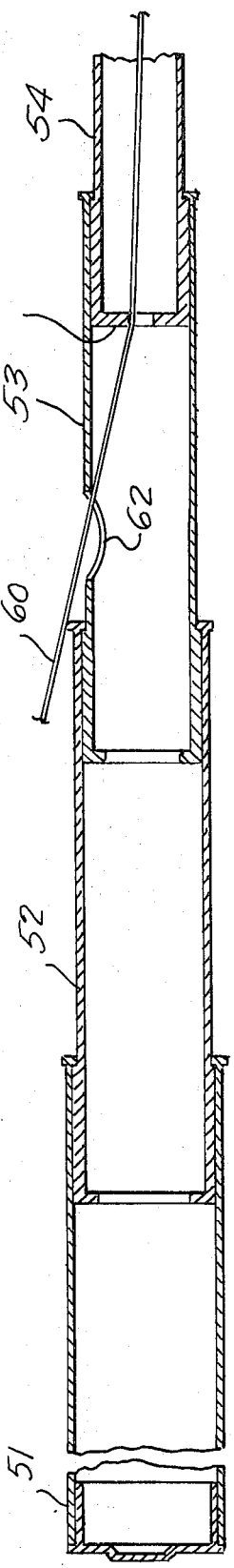

EYELESS FISHING POLE

BACKGROUND OF THE INVENTION

1. Field of the Invention

The present invention relates to collapsible fish poles.

2. Summary of the Invention

A collapsible eyeless fish pole is disclosed formed of telescoping hollow plastic members with the fish line being guided through the center of the telescoping members without the necessity of exterior eyes.

The primary object of the invention is to provide a take apart telescoping plactic fish rod which can be nested together for storage in the hollow handle.

Other objects and advantages will become apparent in the following specification when considered in light of the attached drawings.

BRIEF DESCRIPTION OF THE DRAWINGS

FIG. 1 is a side elevation of the invention;

FIG. 2 is an exploded side elevation of the telescoping rod members shown detached;

FIG. 3 is a side elevation of the handle for the rod;

FIG. 4 is a bottom plan view of the handle of the rod;

FIG. 5 is an enlarged fragmentary longitudinal sectional view, taken along the line 5—5 of FIG. 4, looking in the direction of the arrows;

FIG. 6 is a fragmentary longitudinal sectional view of the pole in assembled position;

FIG. 7 is a transverse sectional view through a connection between the telescoping elements;

FIG. 8 is a longitudinal sectional view through the tip section of the rod;

FIG. 9 is a side elevation of a modified form of the invention in extended position;

FIG. 10 is a view similar to FIG. 9 in collapsed position;

FIG. 11 is an enlarged fragmentary sectional view of the FIG. 10 structure;

FIG. 12 is an enlarged fragmentary sectional view of the FIG. 9 structure; and

FIG. 13 is an enlarged fragmentary sectional view of the FIG. 9 structure.

DESCRIPTION OF THE PREFERRED EMBODIMENT

Referring now to the drawings in detail, wherein like reference characters indicate like parts throughout the several figures, the reference numeral 10 indicates generally a telescoping take apart fishing rod constructed in accordance with the invention.

The fishing rod 10 includes an elongate hollow handle section indicated generally at 11 and including a hand grip 12, fixed reel clamp member 13, moveable reel clamp member 14 and reel clamping nut 15. The butt end 16 of the handle 11 is open to receive a flashlight 17 secured therein by a plurality of spring fingers 18 as can be seen in FIG. 5. The flashlight 17 can be reversed so as to shine outwardly from the handle 11 or along the handle 11 and the rod 10 as will be described.

A light transmitting generally cylindrical plastic body 19 closes the end of the hollow handle 11 opposite the end 16 and is secured therein by a rivet 20 extending therethrough. The body 19 has an arcuate guide passage 21 extending from the side thereof forwardly out one end thereof at 22. An opening 23 in the side of the handle 11 communicates with the passage 21 so that a fish line 24 may pass through the opening 23 and passage 21 for reasons to be assigned.

A plurality of tapered hollow light transmitting fishing rod segments 25, 26, 27, 28 and 29 are each provided with a metal ferrule 25F, 26F, 27F, 28F and 29F to prevent the splitting of the sections as they are assembled. The tip section 29 has a reduced diameter exit 30 to serve as a tip guide for the fish line 24. In FIG. 7 a reduced diameter fish line guide 31 is illustrated in the section 26 and may be used in each of the sections if desired.

In the use and operation of the invention the sections 25, 26, 27, 28 and 29 are assembled in end to end relation as illustrated in FIG. 1 with the fish line 24 extending from the reel 32 through the opening 23 and through the sections 25, 26, 27, 28 and 29 exiting through the tip section 29 at the small end thereof. The fish rod 10 is then used in a conventional manner with the flashlight 17 being available to illuminate the rod 10 by light passing through the light transmitting sections 25, 26, 27, 28 and 29 and light transmitting handle 11.

When desired the flashlight 17 may be reversed and make its light available from the butt end of the handle 11 as desired. To store the sections 25, 26, 27, 28 and 29 the fish line 24 is removed and the sections are disassembled with the tip section 29 inserted into the next larger section 28 successively through until all of the sections are within the section 25 which is then placed within the hollow handle 11 as is illustrated in FIG. 5.

In FIG. 9, the reference numeral 50 indicates generally a modified form of the invention as a telescoping eyeless fish pole. The eyeless fish pole 50 includes a handle 51 which is hollow and adapted to have a flashlight similar to the flashlight 17 mounted therein.

A plurality of telescoping successively smaller sections 52, 53, 54, 55, 56, 57, and 58 are adapted to telescope into the handle 51 as can be seen in FIGS. 10 and 11, and extend outwardly therefrom as shown in FIGS. 9, 12 and 13 to form an extended fish pole. The section 52 may have aluminum reflecting paint on the interior surfaces thereof to assist in directing the light toward the transparent or translucent plastic sections forming the pole. The sections 54, 55, 56, 57 and 58 each have a line guide 59 integrally formed at their inner ends to guide the fish line 60 which extends from a reel 61 through an opening 62 in the section 53 to pass through the fish pole 50 and out the outer end of the section 58. Each of the sections 52, 53, 54, 55, 56, 57, 58 and the handle 51 has an annular flange 63 formed on its outer end to provide a stop for an inner enlarged portion 64 on each of the sections 52, 53, 54, 55, 56, 57 and 58.

Having thus described the preferred embodiments of the invention, it should be understood that numerous structural modifications and adaptations may be resorted to without departing from the spirit of the invention.

What is claimed is:

1. In an eyeless fish pole, a rod including an elongate hollow handle including a hand grip, fixed reel clamp member, and reel clamping nut, said handle having a butt end that is open for receiving a flashlight, a plurality of spring fingers for mounting said flashlight in said handle, said flashlight being reversible so that it can shine outwardly from the handle or along the handle and the rod, a light transmitting generally cylindrical body closing the end of the hollow handle opposite the butt end and secured therein, said body having an arcuate guide passage extending from the side thereof forwardly at one end thereof, said handle having an opening in the side thereof communicating with said passage whereby a fish line can pass through the opening and passage, a plurality of tapered hollow light transmitting fishing rod segments each provided with a ferrule, and one of said rod segments having a reduced diameter exit defining a tip guide for the fish line.

* * * * *